United States Patent
Kreitzer et al.

[11] Patent Number: 5,969,876
[45] Date of Patent: Oct. 19, 1999

[54] PROJECTION LENSES HAVING LARGE BACK FOCAL LENGTH TO FOCAL LENGTH RATIOS

[75] Inventors: Melvyn H. Kreitzer; Jacob Moskovich, both of Cincinnati, Ohio

[73] Assignee: U.S. Precision Lens Inc., Cincinnati, Ohio

[21] Appl. No.: 09/246,346

[22] Filed: Feb. 8, 1999

Related U.S. Application Data

[62] Division of application No. 08/857,358, May 16, 1997, Pat. No. 5,870,228
[60] Provisional application No. 60/018,325, May 24, 1996.

[51] Int. Cl.$^6$ .............................. G02B 3/00; G02B 9/12; G02B 15/14
[52] U.S. Cl. ..................... 359/651; 359/649; 359/682; 359/689; 359/716; 359/784
[58] Field of Search .................... 359/649–651, 359/716, 784, 680–682, 689

[56] References Cited

U.S. PATENT DOCUMENTS

| | | | |
|---|---|---|---|
| 2,468,564 | 4/1949 | Luneburg | 359/651 |
| 4,189,211 | 2/1980 | Taylor | 359/663 |
| 4,425,028 | 1/1984 | Gagnon et al. | 359/246 |
| 4,461,542 | 7/1984 | Gagnon | 359/495 |
| 4,526,442 | 7/1985 | Betensky | 359/651 |
| 4,548,480 | 10/1985 | Yamamoto et al. | 359/650 |
| 4,564,269 | 1/1986 | Uehara | 359/650 |
| 4,704,009 | 11/1987 | Yamamoto et al. | 359/649 |
| 4,815,831 | 3/1989 | Betensky | 359/649 |
| 4,826,311 | 5/1989 | Ledebuhr | 353/33 |
| 4,838,667 | 6/1989 | Ueda | 359/692 |
| 4,872,748 | 10/1989 | Braat | 359/716 |
| 4,963,007 | 10/1990 | Moskovich | 359/649 |
| 5,042,929 | 8/1991 | Tanaka et al. | 359/708 |
| 5,119,117 | 6/1992 | Ames | 359/763 |
| 5,179,473 | 1/1993 | Yano et al. | 359/691 |
| 5,200,861 | 4/1993 | Moskovich | 359/662 |
| 5,218,480 | 6/1993 | Moskovich | 359/753 |

(List continued on next page.)

FOREIGN PATENT DOCUMENTS

| | | |
|---|---|---|
| 311116 | 4/1989 | European Pat. Off. . |
| 61-205909 | 12/1986 | Japan . |
| 6-317742 | 11/1994 | Japan . |
| WO97/41461 | 11/1997 | WIPO . |

OTHER PUBLICATIONS

*Patent Abstracts of Japan*, vol. 095, No. 009, Oct. 1995: JP 07 140379 (Asahi Optical Co. Ltd.) Jun. 2, 1995, abstract.
Translation of Patent Publication No. 6–317742 (Japan, Nov. 1994), Item 35 above.

*Primary Examiner*—Georgia Epps
*Assistant Examiner*—Evelyn A. Lester
*Attorney, Agent, or Firm*—Maurice M. Klee

[57] ABSTRACT

A projection lens for use with LCD or DMD panels is provided. The lens has three lens units, the first unit having a negative power and at least one plastic lens element having two aspheric surfaces, a second lens unit having a negative power or a weak positive power and at least one color correcting doublet, and a third lens unit having a positive power and an aspheric surface either on a glass element or on a weak plastic element. The projection lens has a back focal length to focal length ratio of at least 3.0, the ratio being achieved by arranging the first, second, and third lens units so that:

$$D_{12}/f_0 > 1.0,$$

$$D_{23}/f_0 > 0.7,$$

and $$1.5 < (D_{12} + D_{23} + BFL)/BFL < 4.0$$

where: $f_0$ is the effective focal length of the combination of the first, second, and third lens units; BFL is the back focal length of the combination of the first, second, and third lens units; $D_{12}$ is the distance between the first and second lens units; and $D_{23}$ is the distance between the second and third lens units.

22 Claims, 7 Drawing Sheets

U.S. PATENT DOCUMENTS

| | | | |
|---|---|---|---|
| 5,278,698 | 1/1994 | Iizuka et al. | 359/682 |
| 5,303,088 | 4/1994 | Sugawara | 359/753 |
| 5,309,283 | 5/1994 | Kreitzer | 359/649 |
| 5,313,330 | 5/1994 | Betensky | 359/676 |
| 5,331,462 | 7/1994 | Yano | 359/689 |
| 5,353,161 | 10/1994 | Ono | 359/691 |
| 5,390,048 | 2/1995 | Miyatake et al. | 359/650 |
| 5,442,484 | 8/1995 | Shikawa | 359/651 |
| 5,455,713 | 10/1995 | Kreitzer | 359/649 |
| 5,493,446 | 2/1996 | Nakajima | 359/650 |
| 5,519,537 | 5/1996 | Shikama | 359/649 |
| 5,579,174 | 11/1996 | Tachihara | 359/784 |
| 5,625,495 | 4/1997 | Moskovich | 359/663 |
| 5,659,424 | 8/1997 | Osawa et al. | 359/649 |
| 5,745,297 | 4/1998 | Kaneko et al. | 359/651 |
| 5,798,868 | 8/1998 | Lee | 359/649 |
| 5,841,587 | 11/1998 | Moskovich | 359/662 |
| 5,870,228 | 2/1999 | Kreitzer et al. | 359/649 |
| 5,900,987 | 5/1999 | Kreitzer | 359/649 |
| 5,900,989 | 5/1999 | Kreitzer | 359/691 |

PROJECTION LENSES HAVING LARGE BACK FOCAL LENGTH TO FOCAL LENGTH RATIOS

CROSS REFERENCE TO RELATED APPLICATIONS

This is a divisional of U.S. Application Ser. No. 08/857,358, filed May 16, 1997, now U.S. Pat. No. 5,870,228, which claims under 35 USC §119(e) of U.S. Provisional Application No. 60/018,325, filed May 24, 1996, the contents of both of which in their entireties are hereby incorporated by reference.

FIELD OF THE INVENTION

This invention relates to projection lenses and, in particular, to projection lenses which can be used, inter alia, to form an image of an object composed of pixels, such as, a LCD or DMD.

BACKGROUND OF THE INVENTION

Projection lens systems (also referred to herein as "projection systems") are used to form an image of an object on a viewing screen. The basic structure of such a system is shown in FIG. 7, wherein is a light source (e.g., a tungsten-halogen lamp), 12 is illumination optics which forms an image of the light source (hereinafter referred to as the "output" of the illumination system), 14 is the object which is to be projected (e.g., a matrix of on and off pixels), and 13 is a projection lens, composed of multiple lens elements, which forms an enlarged image of object 14 on viewing screen 16. FIG. 7 is drawn for the case of a LCD panel where the output of the illumination system strikes the back of the panel and passes through those pixels which are transparent. DMDs, on the other hand, work by reflection and thus the output of the illumination system is routed to the front of the panel by a prism or similar device.

Projection lens systems in which the object is a pixelized panel are used in a variety of applications, including data display systems. Such projection lens systems preferably employ a single projection lens which forms an image of either a single panel having, for example, red, green, and blue pixels, or three individual panels, one for each color. In some cases, two panels are used, one for two colors, e.g., red and green, and the other for one color, e.g., blue. A spinning filter wheel or similar device is associated with the panel for the two colors and the panel is alternately fed information for the two colors in synchrony with the filter.

There exists a need for a projection lens for use with a pixelized panel which simultaneously has at least the following properties: (1) a very long back focal length, e.g., a back focal length greater than at least three times the lens' focal length; (2) a high level of color correction; (3) low distortion; and (4) low sensitivity to temperature changes.

A long back focal length, i.e., the distance from the last lens surface to the pixelized panel, is needed, especially where multiple panels are used, to accommodate the optical elements, e.g., filters, beam splitters, prisms, and the like, used in combining the light from the different color optical paths which the lens system projects towards the viewing screen. In addition, a long back focal length allows the output of the illumination system to be in the vicinity of the projection lens for output distances which are relatively large. Relatively large output distances are desirable since they provide relatively shallow entrance angles for the light at the pixelized panel which is especially important in the case of LCD panels.

A high level of color correction is important because color aberrations can be easily seen in the image of a pixelized panel as a smudging of a pixel or, in extreme cases, the complete dropping of a pixel from the image. These problems are typically most severe at the edges of the field. In general terms, the color correction, as measured at the pixelized panel, should be better than about a pixel and, preferably, better than a half a pixel to avoid these problems.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lens of FIG. 1 being, for example, designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. As described below, plastic elements can be used and temperature insensitivity still achieved provided the powers and locations of the plastic elements are properly chosen.

The projection lenses described below achieve all of the above requirements and can be successfully used in producing low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313,330, and Yano, U.S. Pat. No. 5,331,462. Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with a pixelized panel which simultaneously have each of the four desired properties discussed above. This object is achieved by means of a projection lens which comprises in order from its image side to its object side (i.e., from its long conjugate side to its short conjugate side):

(A) a first lens unit having a negative power and comprising a plastic lens element having at least one aspheric surface;

(B) a second lens unit having a negative power or a weak positive power and comprising a color correcting doublet;

(C) a third lens unit having a positive power and comprising an aspheric surface either on a glass element or on a weak plastic element;

wherein:

$$D_{12}/f_0 > 1.0 \tag{1}$$

$$D_{23}/f_0 > 0.7 \tag{2}$$

$$1.5 < (D_{12} + D_{23} + BFL)/BFL < 4.0, \tag{3}$$

and $$BFL/f_0 > 3.0 \tag{4}$$

where:

(i) $f_0$ is the effective focal length of the combination of the first, second, and third lens units;

(ii) BFL is the back focal length of the combination of the first, second, and third lens units for an object located at infinity along the long conjugate side of the projection lens;

(iii) $D_{12}$ is the distance between the first and second lens units; and (iv) $D_{23}$ is the distance between the second and third lens units.

Limitations (1)–(3) relate to the physical structure of the projection lens. When these are satisfied, limitation (4) can be achieved while still achieving high levels of color correction and low levels of distortion. In certain embodiments, the BFL/$f_0$ ratio (limitation (4)) is greater than 4.0 and in still further embodiments, it is greater than 5.0.

In addition to limitations (1)–(4), the projection lenses also preferably satisfy the following limitation:

$$|EPD|/f_0 > 4.0, \tag{5}$$

where EPD is the distance from the pixelized panel to the projection lens' entrance pupil, as seen from the illumination optics. A large $|EPD|/f_0$ ratio is desirable because (1) to obtain a bright, uniformly-illuminated image it is important to match the location and size of the exit pupil of the illumination system with the entrance pupil of the lens system and (2) illumination optics generally work best when the exit pupil is located a long distance from the light source. In addition, a large $|EPD|/f_0$ ratio is desirable since it causes light from the illumination optics to intersect the pixelized panel at relatively shallow angles where such panels work best. For some embodiments, the $|EPD|/f_0$ ratio may be as great as 100 or more.

In certain embodiments, the projection lenses of the invention are designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens. The projection lenses of FIGS. 1 and 2 were designed in this way.

In accordance with these embodiments, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

In some embodiments (e.g., the projection lenses of FIGS. 1 and 2), the magnification of the projection lens system is varied by changing the distance between the pixelized panel and the second and third lens units while holding constant (a) the distance between the second and third lens units and (b) the distance between the first lens unit and the pixelized panel.

The projection lenses of the invention are also designed to be substantially athermal. As discussed below, this is done by: (1) employing plastic lens elements having substantial power only at points in the system where the axial beam height is small, i.e., only in the first unit; and (2) employing only weak plastic elements at other locations in the system, e.g., the third unit. In this way, temperature changes do not substantially affect the overall optical properties of the system and, in particular, do not substantially affect the system's back focal length.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are of the retrofocus type and comprise three lens units which, as can be seen in FIGS. 1–6, are widely spaced from one another. For example, in the lens systems shown in the figures, the largest spacing between any two lens elements within a unit is less than 30% of the smallest spacing between two units, where the spacing between units (i.e., $D_{12}$ and $D_{23}$) is measured from the last surface of a unit to the first surface of the next unit. This approximately 30% ratio occurs in the lens system of FIG. 3. For all the other lens systems, the ratio is less than 10%. The lens systems are characterized by a high level of aberration correction and a wide field of view, i.e., a half field of view greater than about 35°.

The first lens unit has a negative power and at least one plastic lens element which has at least one aspheric surface. Preferably, the first lens unit comprises a single plastic lens element and even more preferably, that single plastic lens element has two aspheric surfaces. A single element is preferred for the first lens unit since the elements of that unit are generally the largest in the system and thus minimizing the size of those elements reduces the overall cost of the system. In certain embodiments, e.g., to achieve an ultra wide field of view, the first lens unit can include two lens elements, which are preferably both composed of plastic and both have two aspheric surfaces. In general terms, the first lens unit and, in particular, the aspheric surfaces of that unit, contribute to the correction of the system's distortion which, as discussed above, needs to be highly corrected for lens systems used with pixelized panels. The distortion correction is generally better than about one percent at the image.

Figure 1:
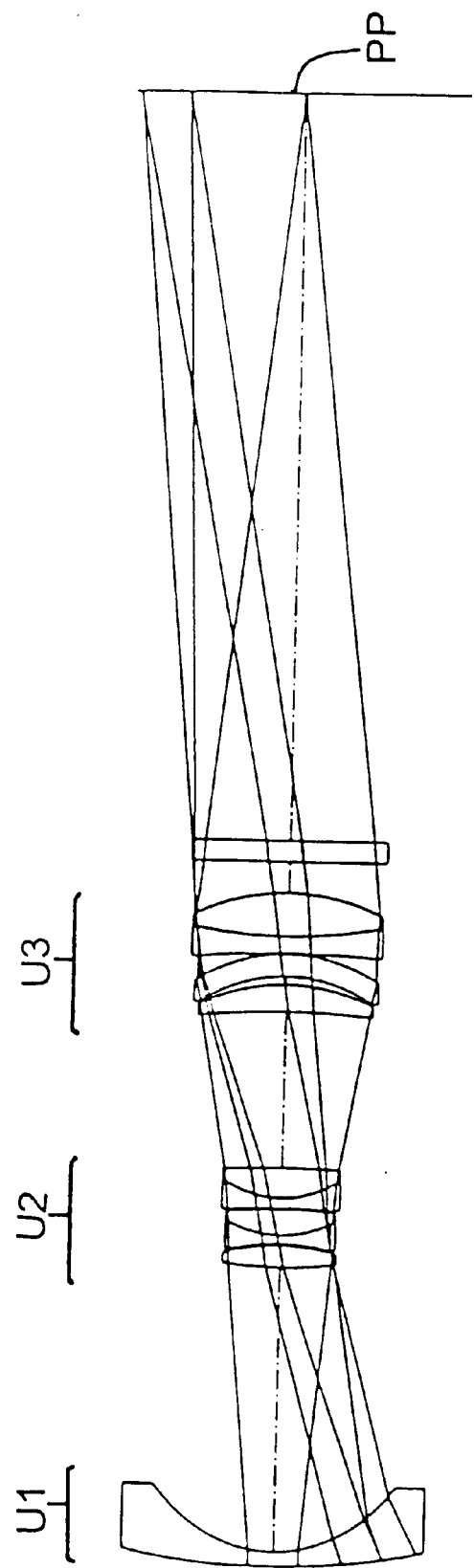
FIGS. 1–6 are schematic side views of projection lenses constructed in accordance with the invention.
Figure 2:
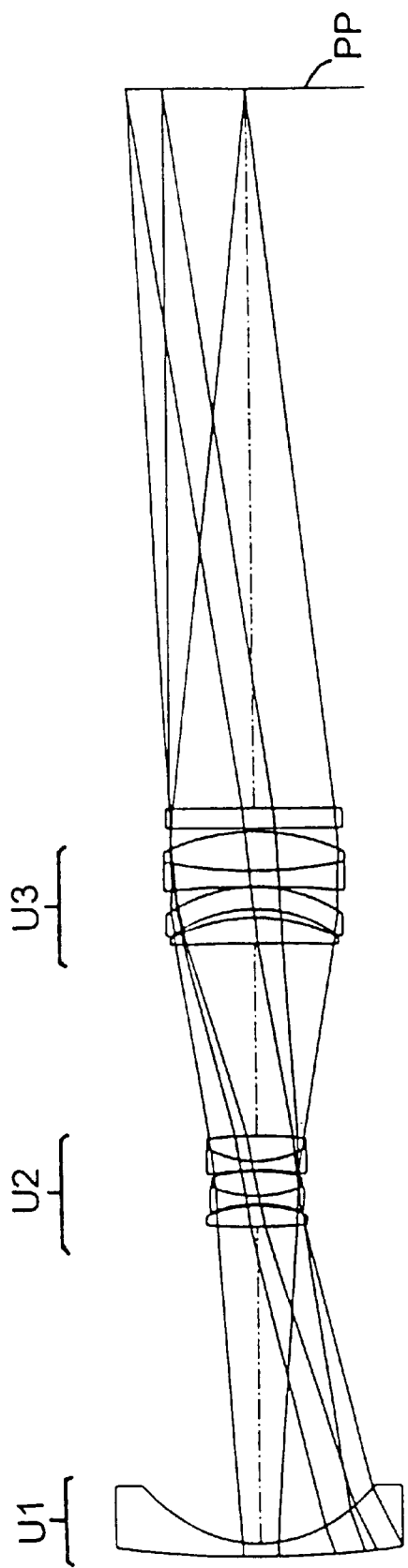
Figure 3:
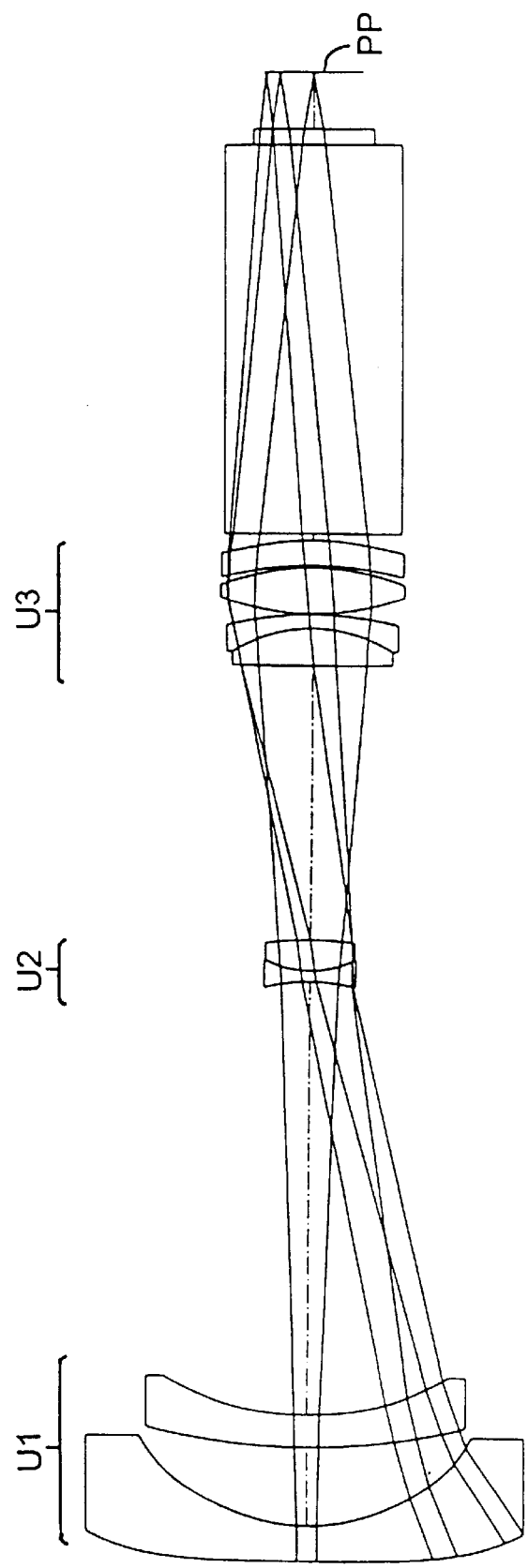
Figure 4:
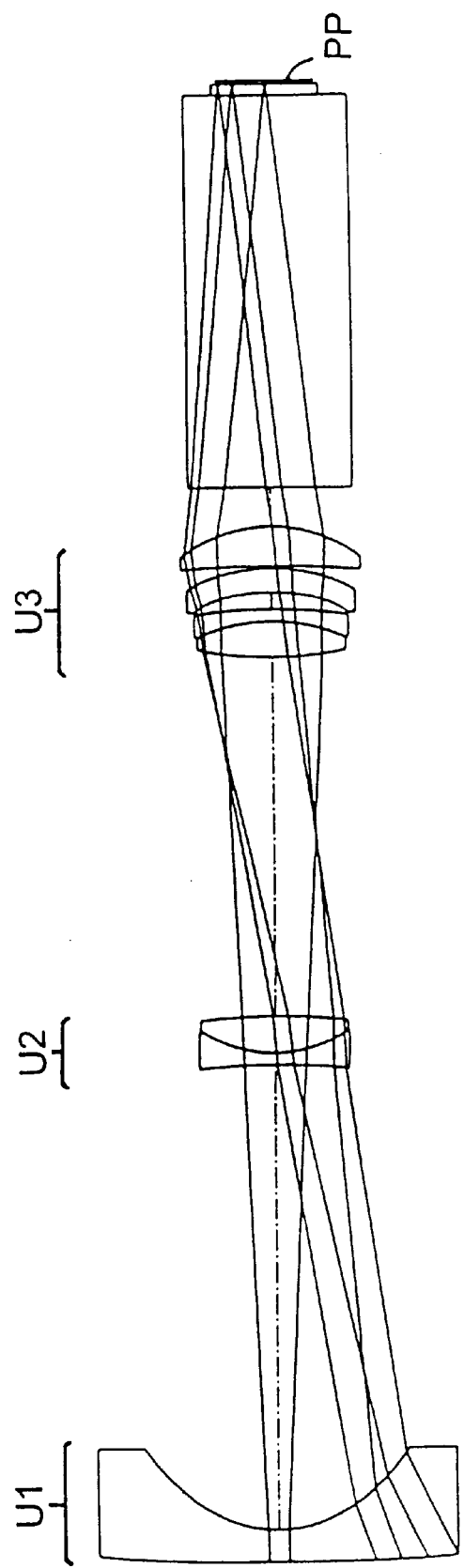
Figure 5:
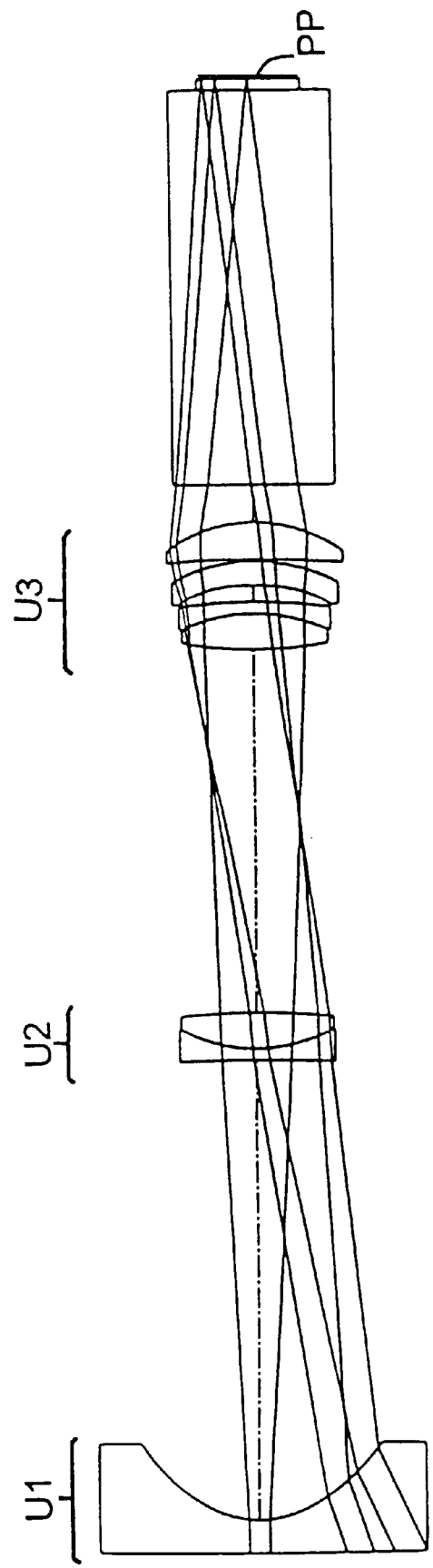
Figure 6:
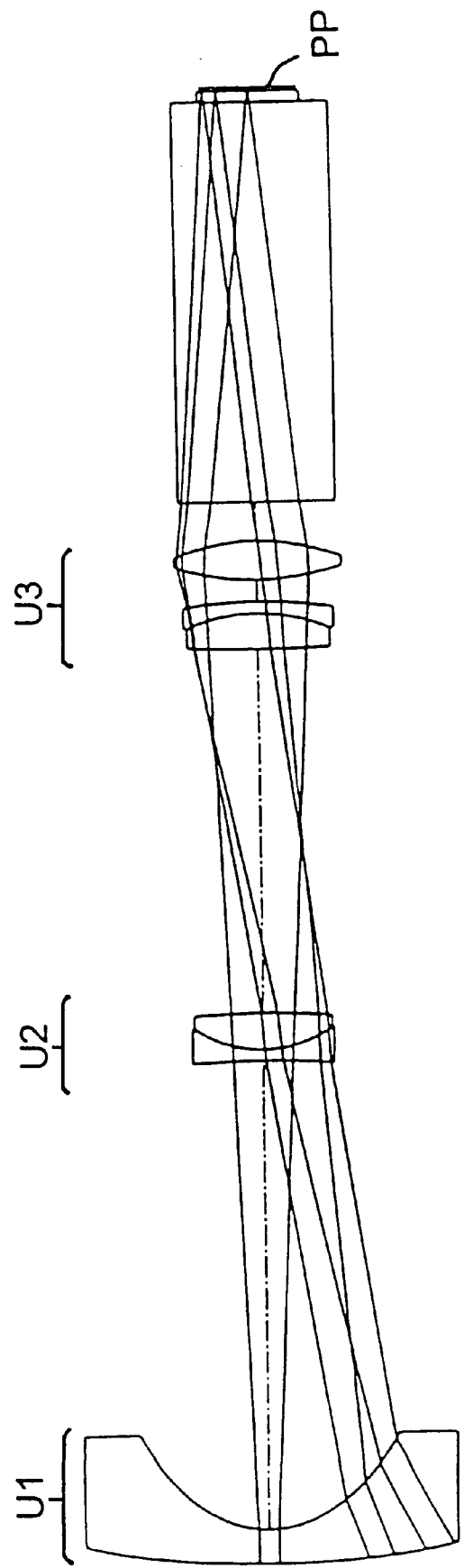
Figure 7:
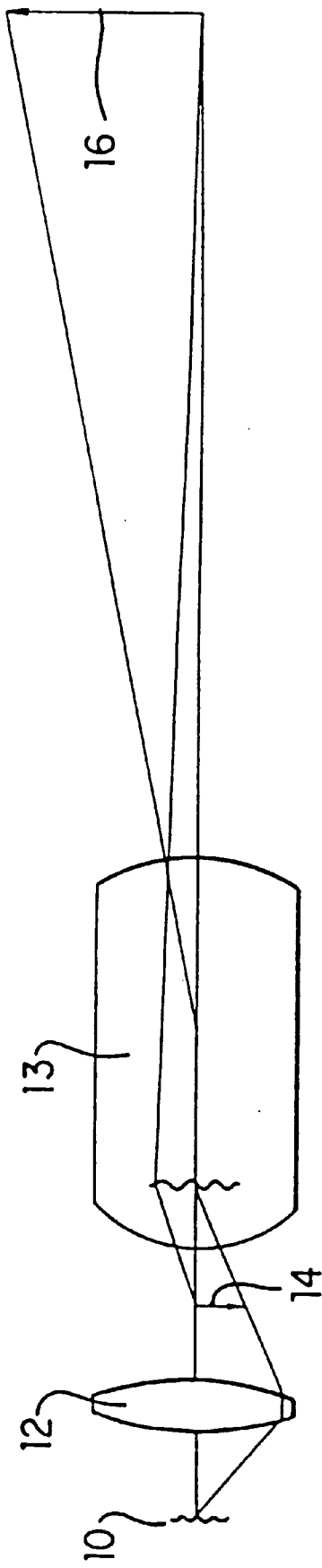
FIG. 7 is a schematic diagram showing an overall projection lens system in which the projection lens of the present invention can be used.

The second lens unit either has a negative power (FIGS. 1–4 and 6) or a weak positive power (FIG. 5), where a weak positive power means a power ($P_2$) which is less than about 10% of the power of the combination of the first, second, and third lens units ($P_0$), and is preferably less than about 5%. The second lens unit comprises at least one color correcting doublet and in some cases may comprise two color correcting doublets (FIGS. 1 and 2). The output of the illumination system is in the vicinity of the second lens unit and thus this unit preferably includes only glass elements which can withstand the heat generated in the vicinity of that output. In general terms, the second lens unit contributes to the correction of off-axis color.

The third lens unit has a positive power and comprises an aspheric surface either on a glass element (FIG. 6) or on a weak plastic element (FIGS. 1–5), where a weak plastic element is one having a power ($P_{element}$) whose absolute value is less than about 5% of the power of the combination of the first, second, and third lens units ($P_0$). The weak plastic element, when used, can be considered as a corrector lens element since its purpose is to correct lens aberrations, as opposed to providing optical power for the system. The third lens unit preferably contains a color correcting doublet, whereby the overall system typically contains two color correction doublets (one in the second lens unit and one in the third lens unit) and may contain three color correcting doublets (two in the second lens unit and one in the third lens unit).

The magnitudes of the powers of the first and third lens units are generally similar and each is substantially greater than the magnitude of the power of the second lens unit.

As discussed above, the projection lenses of the invention are athermalized so that the optical performance of the system, including, in particular, the system's back focal length, does not substantially change as the projection lens is heated from room temperature to its operating temperature. More specifically, the change in the back focal length is preferably less than an amount which will significantly change the modulation transfer function (MTF) of the system, e.g., the change in the MTF should be less than about 5%. For the specific examples presented below, this MTF criterion corresponds to a change in the back focal length of less than about 0.1 millimeters. The desired thermal stabilization of the lens' focus is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use at least some plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by taking into account the location and power of the plastic lens elements, as well as the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small will in general have less effect on the overall thermal stability of the system than elements for which the marginal ray height is large.

Based on the foregoing considerations, athermalization of the projection lenses of the present invention is achieved by (1) using only low powered plastic lens elements at locations where the marginal ray height is large, (2) using high powered plastic lens elements only at locations where the marginal ray height is small, and (3) excluding plastic elements from the second lens unit where the output of the illumination system is located.

The level of athermalization achieved is preferably optimized using a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

In addition to a long back focal length, a high level of color correction, low distortion, and low temperature sensitivity, for some applications, it is desirable to have a projection lens with a short focal length so that an adequate level of magnification of the pixelized panel can be achieved. In particular, such short focal length lenses are needed when the pixelized panel is a DMD, which typically has a characteristic dimension, e.g., a diagonal, of less than about 20 millimeters. The projection lenses of FIGS. 3–6 have focal lengths of less than 20 millimeters and thus are suitable for use with DMDs. The lenses of FIGS. 1–2, on the other hand, have focal lengths above 50 millimeters and thus are more suitable for use with LCDs. The color correction of the lenses of FIGS. 1–2 tends to be somewhat better than that of the lenses of FIGS. 3–6, especially in relation to pixel size, since the pixel size for a LCD (FIGS. 1–2) is generally much larger than that of a DMD (FIGS. 3–6).

FIGS. 1 to 6 illustrate various projection lenses constructed in accordance with the invention. Corresponding prescriptions and optical properties appear in Tables 1 to 6, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant.

The abbreviations used in the tables are as follows:

| | |
|---|---|
| EFL | effective focal length |
| FVD | front vertex distance |
| f/ | f-number |
| ENP | entrance pupil as seen from the long conjugate |

-continued

| | |
|---|---|
| EXP | exit pupil as seen from the long conjugate |
| BRL | barrel length |
| OBJ HT | object height |
| MAG | magnification |
| STOP | location of aperture stop |
| IMD | image distance |
| OBD | object distance |
| OVL | overall length. |

The designation "a" associated with various surfaces in the tables represents an aspheric surface, i.e., a surface for which at least one of D, E, F, G, H, or J in the above equation is not zero. The designation "c" represents a conic surface for which the k value in the above equation is not zero. All dimensions given in the tables are in millimeters. The tables are constructed on the assumption that light travels from left to right in the figures. In actual practice, the viewing screen will be on the left and the pixelized panel will be on the right, and light will travel from right to left. The pixelized panel is shown by the designation "PP" in the figures.

In Tables 1 and 2, the first lens unit ($U_1$) comprises surfaces 1–2, the second lens unit ($U_2$) comprises surfaces 3–10, and the third lens unit ($U_3$) comprises surfaces 11–17. Surfaces 18–19 represent a glass plate, e.g., a protective plate, at the back end of the lens system. It is not part of the lens system and is not included in the summary of lens properties set forth in Tables 7 and 8, although it is included in the first order property calculations of Table 1 and 2.

In Table 3, the first lens unit ($U_1$) comprises surfaces 1–4, the second lens unit ($U_2$) comprises surfaces 5–7, and the third lens unit ($U_3$) comprises surfaces 9–15. Surfaces 16–18 represent a prism and related DMD components located at the back end of the lens system. These components are not part of the lens system and are not included in the summary of lens properties set forth in Tables 7 and 8, although they are included in the first order property calculations of Table 3.

In Tables 4–5, the first lens unit ($U_1$) comprises surfaces 1–2, the second lens unit ($U_2$) comprises surfaces 3–5, and the third lens unit (u3) comprises surfaces 7–13. As in Table 3, surfaces 14–16 represent DMD components at the back end of the lens system, which are not included in the summary of lens properties set forth in Tables 7 and 8, but are included in the first order property calculations of Tables 4–5.

In Table 6, the first lens unit ($U_1$) comprises surfaces 1–2, the second lens unit (U2) comprises surfaces 3–5, and the third lens unit ($U_3$) comprises surfaces 7–11. As in Tables 3–5, surfaces 12–14 are DMD components which are not included in Tables 7 and 8, but are included in the first order property calculations of Table 6.

As discussed above, the projection lenses of FIGS. 1 and 2 were designed using the pseudo-aperture stop/entrance pupil technique of Betensky, U.S. Pat. No. 5,313,330. Surface 20 in Tables 1 and 2 constitutes the pseudo-aperture stop. Its location corresponds to the location of the output of the illumination system. As can be seen in the subtables labeled "Variable Spaces," the distance from the pseudo-aperture stop to the pixelized panel, i.e., the "Image Distance," is essentially constant for all focal positions (magnifications) of the projection lens system.

As also discussed above, the projection lenses of FIGS. 1 and 2 can be focused by holding the first unit fixed relative to the pixelized panel and moving the second and third units as a group relative to the panel. Alternatively, the entire projection lens can be moved and then the first unit moved back to its constant position. As shown in Tables 1 and 2, movement of the second and third units through a distance on the order of 5–10 millimeters achieves a change in magnification of approximately six fold. The projection lenses of FIGS. 3–6 are focused by moving the entire lens relative to the pixelized panel.

Tables 7 and 8 summarize various properties of the lens systems of the invention. The values listed in these tables are for the first, second, and third lens units per se and do not include the optical elements after those units shown in Tables 1–6. The BFL values are calculated for an object at infinity along the long conjugate of the system. It should be noted that the EPD values of Table 7 correspond to the EXP values of the prior tables, except for Tables 1 and 2, where the EPD values are obtained from the "Variable Spaces" subtable.

As shown in Table 8, each of lens systems 1–6 satisfy limitations (1) through (5) set forth above. In addition, the table shows that the ratio of $D_{12}$ to $D_{23}$ lies in the following range for the lens systems of the invention:

$$1.0 < D_{12}/D_{23} < 2.5 \tag{6}$$

Although specific embodiments of the invention have been described and illustrated, it is to be understood that a variety of modifications which do not depart from the scope and spirit of the invention will be evident to persons of ordinary skill in the art from the foregoing disclosure.

TABLE 1

Lens Data

| Surf. No. | Type | Radius | Thickness | Glass | Clear Aperture Diameter |
|---|---|---|---|---|---|
| 1 | a | 368.5410 | 5.00000 | ACRYLIC | 106.58 |
| 2 | a | 45.6769 | Space 1 | | 83.33 |
| 3 | | 153.3231 | 7.50000 | FD2 | 38.39 |
| 4 | | −72.7876 | 0.85000 | | 37.24 |
| 5 | | −78.3469 | 3.00000 | TAF1 | 36.55 |
| 6 | | 38.4407 | 9.30000 | C10 | 36.14 |
| 7 | | −155.9928 | 0.18000 | | 36.91 |
| 8 | | −515.5717 | 3.50000 | LAC14 | 37.13 |
| 9 | | 37.4924 | 10.30000 | F5 | 38.65 |
| 10 | | −382.1087 | 54.70000 | | 39.76 |
| 11 | | −281.0522 | 9.60000 | FC5 | 58.31 |
| 12 | | −67.1076 | 3.00000 | | 59.72 |
| 13 | a | −52.3755 | 8.00000 | ACRYLIC | 59.77 |
| 14 | a | −54.3902 | 0.20000 | | 62.82 |
| 15 | | −397.9817 | 6.00000 | FD6 | 63.23 |
| 16 | | 163.8136 | 15.00000 | FC5 | 64.27 |
| 17 | | −74.5926 | Space 2 | | 65.18 |
| 18 | | ∞ | 7.50000 | C5 | 66.15 |
| 19 | | ∞ | −89.65000 | | 66.88 |
| 20 | | Aperture stop | Image distance | | 79.49 |

Symbol Description a - Polynomial asphere

Even Polynomial Aspheres

| Surf. No. | D | E | F | G | H | I |
|---|---|---|---|---|---|---|
| 1 | 9.4659E−07 | −5.7939E−10 | −5.1394E−14 | 1.8767E−16 | −6.7075E−20 | 7.5390E−24 |
| 2 | 1.2713E−07 | −3.4925E−10 | −6.8949E−13 | −1.9181E−16 | 6.0301E−19 | −2.2113E−22 |
| 13 | 2.1223E−07 | 4.2506E−10 | 8.1369E−15 | 8.1278E−17 | 6.1788E−22 | 2.7541E−23 |
| 14 | 4.0595E−07 | 2.6522E−10 | 1.3626E−13 | −8.7488E−17 | 6.4370E−20 | 3.6391E−24 |

Variable Spaces

| Focus Pos. | Space 1 T(2) | Space 2 T(17) | Focal Shift | Image Distance |
|---|---|---|---|---|
| 1 | 106.620 | 5.370 | −0.300 | 355.003 |
| 2 | 101.220 | 10.770 | −0.300 | 354.997 |
| 3 | 111.990 | 0.000 | −0.500 | 355.007 |

SYSTEM FIRST ORDER PROPERTIES, POS 1

OBJ. HT: −1520.0    f/ 4.50 MAG: −0.0380
STOP: 0.00 after surface 20. DIA: 79.494
EFL: 80.0069    FVD: 520.973    ENP: 67.4373
IMD: 355.003    BRL: 165.970
OBD: −2056.18    OVL: 2577.15

SYSTEM FIRST ORDER PROPERTIES, POS 2

OBJ. HT: −900.00    f/ 4.50 MAG: −0.0640
STOP: 0.00 after surface 20. DIA: 79.470
EFL: 82.4051    FVD: 520.967    ENP: 66.8465
IMD: 354.997    BRL: 165.970
OBD: −1240.13    OVL: 1761.10

TABLE 1-continued

SYSTEM FIRST ORDER PROPERTIES, POS 3

OBJ. HT: −5300.0  f/ 4.50 MAG: −0.0108
STOP: 0.00 after surface 20. DIA: 79.560
EFL: 77.7565  FVD: 520.977  ENP: 68.0207
IMD: 355.007  BRL: 165.970
OBD: −7148.70  OVL: 7669.68

First Order Properties of Elements

| Element Number | Surface Numbers | | Power | f' | lpp | l'pp |
|---|---|---|---|---|---|---|
| 1 | 1 | 2 | −0.94219E−02 | −106.14 | 3.8404 | 0.47598 |
| 2 | 3 | 4 | 0.13041E−01 | 76.678 | 3.1189 | −1.4807 |
| 3 | 5 | 6 | −0.30437E−01 | −32.854 | 1.1205 | −0.54976 |
| 4 | 6 | 7 | 0.16064E−01 | 62.251 | 1.2428 | −5.0435 |
| 5 | 8 | 9 | −0.20074E−01 | −49.815 | 1.9145 | −0.13922 |
| 6 | 9 | 10 | 0.17619E−01 | 56.758 | 0.57800 | −5.8907 |
| 7 | 11 | 12 | 0.56303E−02 | 177.61 | 8.3458 | 1.9927 |
| 8 | 13 | 14 | 0.10916E−03 | 9160.9 | 445.40 | 462.54 |
| 9 | 15 | 16 | −0.70362E−02 | −142.12 | 2.3337 | −0.96059 |
| 10 | 16 | 17 | 0.93462E−02 | 106.99 | 7.0674 | −3.2181 |

First-Order Properties of Doublets

| Element Numbers | | Surface Numbers | | Power | f' | lpp | l'pp |
|---|---|---|---|---|---|---|---|
| 3 | 4 | 5 | 7 | −0.13497E−01 | −74.092 | −1.0131 | −9.0861 |
| 5 | 6 | 8 | 10 | −0.22018E−02 | −454.17 | −3.8246 | −12.430 |
| 9 | 10 | 15 | 17 | 0.28380E−02 | 352.36 | 28.772 | 16.685 |

TABLE 2

Lens Data

| Surf. No. | Type | Radius | Thickness | Glass | Clear Aperture Diameter |
|---|---|---|---|---|---|
| 1 | a | 429.0479 | 5.00000 | ACRYLIC | 108.02 |
| 2 | a | 46.0871 | Space 1 | | 85.64 |
| 3 | | 308.4044 | 7.50000 | FL5 | 37.01 |
| 4 | | −49.2176 | 0.85000 | | 35.75 |
| 5 | | −49.6570 | 3.00000 | TAF1 | 34.14 |
| 6 | | 42.9034 | 9.30000 | C10 | 31.96 |
| 7 | | −62.7809 | 0.50000 | | 32.30 |
| 8 | | −104.5868 | 3.20000 | TAF1 | 32.36 |
| 9 | | 37.3326 | 9.30000 | FD8 | 34.15 |
| 10 | | −156.2506 | 72.27450 | | 35.36 |
| 11 | | −1142.8400 | 9.60000 | FC5 | 61.00 |
| 12 | | −68.7114 | 3.30000 | | 61.75 |
| 13 | a | −52.1950 | 8.00000 | ACRYLIC | 61.68 |
| 14 | a | −56.2840 | 0.20000 | | 64.67 |
| 15 | | −356.0175 | 5.70000 | FD6 | 64.65 |
| 16 | | 174.7998 | 14.30000 | FC5 | 65.48 |
| 17 | | −79.1509 | Space 2 | | 66.20 |
| 18 | | ∞ | 7.50000 | C5 | 64.11 |
| 19 | | ∞ | −89.65000 | | 64.08 |
| 20 | | Aperture stop | Image distance | | 79.49 |

Symbol Description a - Polynomial asphere

Even Polynomial Aspheres

| Surf. No. | D | E | F | G | H | I |
|---|---|---|---|---|---|---|
| 1 | 5.0896E−07 | −4.1457E−10 | −6.9178E−14 | 1.8713E−16 | −6.7901E−20 | 7.7140E−24 |
| 2 | −6.6893E−07 | −2.0408E−10 | −6.7153E−13 | −1.6876E−16 | 5.6336E−19 | −2.0869E−22 |
| 13 | 1.4772E−07 | 4.0695E−10 | −1.4288E−13 | 2.1258E−16 | −1.3073E−19 | 7.5704E−23 |
| 14 | 4.4237E−07 | 1.4337E−10 | 2.4751E−13 | −2.2448E−16 | 1.0947E−19 | 8.6717E−25 |

Variable Spaces

| Focus Pos. | Space 1 T(2) | Space 2 T(17) | Image Distance | Focal Shift |
|---|---|---|---|---|

TABLE 2-continued

| | | | | |
|---|---|---|---|---|
| 1 | 118.697 | 5.370 | 354.996 | −0.270 |
| 2 | 116.297 | 7.770 | 355.021 | −0.270 |
| 3 | 121.467 | 2.600 | 355.015 | −0.270 |

SYSTEM FIRST ORDER PROPERTIES, POS 1

OBJ. HT: −1160.0  f/  4.50 MAG:  −0.0380
STOP: 0.00 after surface 20. DIA: 79.476
EFL: 62.9170  FVD: 548.937  ENP: 69.0765
IMD: 354.996  BRL: 193.941
OBD: −1597.85  OVL: 2146.79

SYSTEM FIRST ORDER PROPERTIES. POS 2

OBJ. HT: −715.00  f/  4.50 MAG:  −0.0620
STOP: 0.00 after surface 20. DIA: 79.472
EFL: 63.6221  FVD: 548.962  ENP: 68.8085
IMD: 355.021  BRL: 193.941
OBD: −968.875  OVL: 1517.84

SYSTEM FIRST ORDER PROPERTIES, POS 3

OBJ. HT: −4400.0  f/  4.50 MAG:  −0.0100
STOP: 0.00 after surface 20. DIA: 79.488
EFL: 62.1225  FVD: 548.956  ENP: 69.3830
IMD: 355.015  BRL: 193.942
OBD: −6153.74  OVL: 6702.70

First Order Properties of Elements

| Element Number | Surface Numbers | | Power | f' | lpp | l'pp |
|---|---|---|---|---|---|---|
| 1 | 1 | 2 | −0.95218E−02 | −105.02 | 3.7663 | 0.40456 |
| 2 | 3 | 4 | 0.13672E−01 | 73.144 | 4.1130 | −0.65638 |
| 3 | 5 | 6 | −0.34201E−01 | −29.239 | 0.89346 | −0.77195 |
| 4 | 6 | 7 | 0.19173E−01 | 52.156 | 2.5873 | −3.7861 |
| 5 | 8 | 9 | −0.28491E−01 | −35.099 | 1.3147 | −0.46929 |
| 6 | 9 | 10 | 0.22583E−01 | 44.281 | 1.0799 | −4.5198 |
| 7 | 11 | 12 | 0.67104E−02 | 149.02 | 6.8390 | 0.41118 |
| 8 | 13 | 14 | −0.24281E−03 | −4118.5 | −193.50 | −208.66 |
| 9 | 15 | 16 | −0.69649E−02 | −143.58 | 2.0990 | −1.0306 |
| 10 | 16 | 17 | 0.88121E−02 | 113.48 | 6.7344 | −3.0494 |

First-Order Properties of Doublets

| Element Numbers | | Surface Numbers | | Power | f' | lpp | l'pp |
|---|---|---|---|---|---|---|---|
| 3 | 4 | 5 | 7 | −0.12825E−01 | −77.974 | −4.1287 | −12.745 |
| 5 | 6 | 8 | 10 | −0.49113E−02 | −203.61 | −5.8088 | −13.507 |
| 9 | 10 | 15 | 17 | 0.23238E−02 | 430.34 | 31.545 | 20.224 |

TABLE 3

Lens Data

| Surf. No. | Type | Radius | Thickness | Glass | Clear Aperture Diameter |
|---|---|---|---|---|---|
| 1 | a | 2023.5141 | 6.50000 | ACRYLIC | 79.85 |
| 2 | a | 34.7639 | 14.52895 | | 58.68 |
| 3 | a | 134.3043 | 6.00000. | ACRYLIC | 56.35 |
| 4 | a | 64.3362 | 78.21745 | | 50.16 |
| 5 | | −36.0676 | 2.00000 | LAK8 | 15.96 |
| 6 | | 18.6395 | 5.50000 | SF15 | 15.61 |
| 7 | | −65.0770 | 18.65000 | | 15.53 |
| 8 | | Aperture stop | 31.74455 | | 15.26 |
| 9 | | 582.7881 | 7.00000 | FK5 | 26.57 |
| 10 | | −28.0086 | 2.50000 | SF6 | 27.58 |
| 11 | | −69.3662 | 0.20000 | | 29.62 |
| 12 | | 47.6849 | 8.50000 | FK5 | 31.71 |
| 13 | | −47.6849 | 0.50000 | | 31.89 |
| 14 | a | −66.0000 | 4.50000 | ACRYLIC | 31.52 |
| 15 | a | −51.0000 | 1.20000 | | 31.42 |
| 16 | | ∞ | 70.67000 | BK7 | 30.69 |
| 17 | | ∞ | 3.00000 | ZK7 | 20.37 |
| 18 | | ∞ | 10.47164 | | 19.93 |

TABLE 3-continued

Symbol Description a - Polynomial asphere

Focal Shift = 0.03796

Even Polynomial Aspheres

| Surf. No. | D | E | F | G | H | I |
|---|---|---|---|---|---|---|
| 1 | 1.6047E−06 | 2.3044E−10 | −2.1672E−15 | 4.4338E−17 | −5.7852E−21 | −1.5003E−23 |
| 2 | −4.1021E−06 | −9.2507E−11 | 2.0540E−12 | 1.0280E−15 | 2.4804E−19 | −1.8987E−22 |
| 3 | 1.0218E−06 | −2.3579E−10 | −1.1271E−12 | 3.1803E−16 | −7.2539E−19 | 1.9049E−21 |
| 4 | 5.1894E−06 | 6.9149E−10 | −6.0898E−12 | −2.7710E−15 | 2.2080E−18 | 5.3959E−21 |
| 14 | −2.2395E−06 | 8.9092E−09 | 5.2995E−12 | 2.6729E−15 | 6.1593E−17 | −3.4316E−19 |
| 15 | 3.7601E−06 | 7.4597E−09 | 2.0109E−11 | 5.3271E−15 | −1.2006E−16 | 3.1859E−20 |

SYSTEM FIRST ORDER PROPERTIES

OBJ. HT: −880.00　　f/　3.00　MAG:　−0.0100
STOP; 0.00 after surface 8. DIA: 14.803
EFL: 11.4999　　FVD: 271.683　　ENP: 44.3891
IMD: 10.4716　　BRL: 261.211　　EXP: −2210.50
OBD: −1105.66　　DVL: 1377.34

First Order Properties of Elements

| Element Number | Surface Numbers | | Power | f' | lpp | l'pp |
|---|---|---|---|---|---|---|
| 1 | 1 | 2 | −0.13945E−01 | −71.712 | 4.4322 | 0.76146E−01 |
| 2 | 3 | 4 | −0.38850E−02 | −257.40 | 7.9349 | 3.8011 |
| 3 | 5 | 6 | −0.59167E−01 | −16.901 | 0.75678 | −0.39110 |
| 4 | 6 | 7 | 0.47297E−01 | 21.143 | 0.73852 | −2.5784 |
| 5 | 9 | 10 | 0.18234E−01 | 54.841 | 4.5021 | −0.21637 |
| 6 | 10 | 11 | −0.16830E−01 | −59.417 | −0.96005 | −2.3777 |
| 7 | 12 | 13 | 0.19915E−01 | 50.213 | 2.9401 | −2.9401 |
| 8 | 14 | 15 | 0.24186E−02 | 413.46 | 12.059 | 9.3184 |

First-Order Properties of Doublets

| Element Numbers | | Surface Numbers | | Power | f' | lpp | l'pp |
|---|---|---|---|---|---|---|---|
| 3 | 4 | 5 | 7 | −0.87079E−02 | −114.84 | −5.3788 | −10.254 |
| 5 | 6 | 9 | 11 | 0.11761E−02 | 850.27 | 15.144 | 9.1525 |

TABLE 4

Lens Data

| Surf. No. | Type | Radius | Thickness | Glass | Clear Aperture Diameter |
|---|---|---|---|---|---|
| 1 | a | 832.6757 | 9.00000 | ACRYLIC | 94.49 |
| 2 | ac | 30.0992 | 120.64190 | | 67.91 |
| 3 | | −198.0282 | 3.00000 | LAC8 | 37.20 |
| 4 | | 34.8452 | 9.50000 | FD8 | 36.31 |
| 5 | | −180.9231 | 54.00602 | | 36.02 |
| 6 | | Aperture stop | 42.00000 | | 23.45 |
| 7 | | 97.5036 | 9.50000 | FC5 | 35.95 |
| 8 | | −46.4020 | 3.16000 | SF6 | 36.60 |
| 9 | | −141.7385 | 4.60000 | | 38.18 |
| 10 | a | −55.3507 | 6.25478 | ACRYLIC | 38.51 |
| 11 | a | −50.2569 | 0.70000 | | 42.05 |
| 12 | | −297.6356 | 10.13644 | FC5 | 43.93 |
| 13 | | −39.0453 | 10.00000 | | 45.07 |
| 14 | | ∞ | 102.50000 | BK7 | 41.01 |
| 15 | | ∞ | 3.00000 | ZK7 | 26.00 |
| 16 | | ∞ | 0.99729 | | 26.00 |

Symbol Description a - Polynomial asphere
c - Conic section

Focal Shift = 0.00000

Conics

Surface Number　Constant

TABLE 4-continued

| | 2 | −9.0000E−01 | | | |

Even Polynomial Aspheres

| Surf. No. | D | E | F | G | H | I |
|---|---|---|---|---|---|---|
| 1 | 2.0459E−08 | −4.3610E−11 | 6.1077E−14 | 1.6799E−18 | −9.6593E−21 | 1.5489E−24 |
| 2 | 2.8170E−07 | 1.0846E−10 | −3.4780E−13 | 5.2951E−16 | 3.9333E−19 | −3.7853E−22 |
| 10 | −7.8808E−06 | −3.5347E−09 | −2.5932E−12 | −1.4259E−15 | 7.3563E−17 | −1.3990E−19 |
| 11 | −2.4815E−06 | −2.5456E−09 | 4.0267E−12 | 9.9295E−15 | −1.9894E−17 | 5.4499E−21 |

SYSTEM FIRST ORDER PROPERTIES

OBJ. HT: −1220.0    f/ 3.00  MAG: −0.0100
STOP: 0.00 after surface 6. DIA: 22.201
EFL: 16.7012    FVD: 388.996    ENP: 53.0427
IMD: 0.997294    BRL: 387.999    EXP: −2799.63
OBD: −1617.18    OVL: 2006.17

First Order Properties of Elements

| Element Number | Surface Numbers | | Power | f' | lpp | l'pp |
|---|---|---|---|---|---|---|
| 1 | 1 | 2 | −0.15753E−01 | −63.479 | 6.2742 | 0.22680 |
| 2 | 3 | 4 | −0.24299E−01 | −41.154 | 1.4786 | −0.26017 |
| 3 | 4 | 5 | 0.23329E−01 | 42.864 | 0.92221 | −4.7883 |
| 4 | 7 | 8 | 0.15221E−01 | 65.700 | 4.4183 | −2.1027 |
| 5 | 8 | 9 | −0.11605E−01 | −86.172 | −0.86130 | −2.6309 |
| 6 | 10 | 11 | 0.12712E−02 | 786.67 | 32.363 | 29.385 |
| 7 | 12 | 13 | 0.11024E−01 | 90.709 | 7.7351 | 1.0147 |

First-Order Properties of Doublets

| Element Numbers | | Surface Numbers | | Power | f' | lpp | l'pp |
|---|---|---|---|---|---|---|---|
| 2 | 3 | 3 | 5 | −0.29917E−03 | −3342.6 | −90.725 | −100.82 |
| 4 | 5 | 7 | 9 | 0.38352E−02 | 260.74 | 0.66215 | −7.5574 |

TABLE 5

Lens Data

| Surf. No. | Type | Radius | Thickness | Glass | Clear Aperture Diameter |
|---|---|---|---|---|---|
| 1 | a | 12057.0951 | 9.00000 | ACRYLIC | 86.18 |
| 2 | ac | 26.2462 | 120.77813 | | 61.46 |
| 3 | | −574.2251 | 3.00000 | LAC8 | 38.70 |
| 4 | | 41.7117 | 9.50000 | FD8 | 37.90 |
| 5 | | −205.2798 | 54.32126 | | 37.53 |
| 6 | | Aperture stop | 42.00000 | | 24.32 |
| 7 | | 101.0769 | 9.50000 | FC5 | 35.62 |
| 8 | | −45.9452 | 3.16000 | SF6 | 36.23 |
| 9 | | −144.9350 | 4.60000 | | 37.75 |
| 10 | a | −54.7664 | 6.23804 | ACRYLIC | 38.10 |
| 11 | a | −50.6562 | 0.70000 | | 41.50 |
| 12 | | −277.7475 | 9.68102 | FC5 | 43.21 |
| 13 | | −39.1902 | 10.00000 | | 44.29 |
| 14 | | ∞ | 102.50000 | BK7 | 40.44 |
| 15 | | ∞ | 3.00000 | ZK7 | 25.08 |
| 16 | | ∞ | 1.00563 | | 24.63 |

Symbol Description a - Polynomial asphere
c - Conic section
Focal Shift = 0.00000

Conics

| Surface Number | Constant |
|---|---|
| 2 | −9.0000E−01 |

Even Polynomial Aspheres

| Surf. No. | D | E | F | G | I | |
|---|---|---|---|---|---|---|
| 1 | 8.1077E−08 | −4.9913E−11 | 5.9749E−14 | 1.1278E−18 | −1.0091E−20 | 1.4111E−24 |

TABLE 5-continued

| | | | | | |
|---|---|---|---|---|---|
| 2 | −1.1414E−07 | 4.1498E−10 | −1.5660E−13 | 5.5103E−16 | 3.2180E−19 | −5.1455E−22 |
| 10 | −7.7823E−06 | −3.3365E−09 | −1.9906E−12 | −5.9533E−17 | 7.6060E−17 | −1.3444E−19 |
| 11 | −2.6114E−06 | −2.4026E−09 | 4.3735E−12 | 1.0618E−14 | −1.8774E−17 | 4.8159E−21 |

SYSTEM FIRST ORDER PROPERTIES

OBJ. HT: −1220.0  f/ 3.00  MAG: −0.0100
STOP: 0.00 after surface 6. DIA: 23.170
EFL: 16.7013  FVD: 388.984  ENP: 47.4679
IMD: 1.00563  BRL: 387.978  EXP: −1214.27
OBD: −1622.89  OVL: 2011.88

First Order Properties of Elements

| Element Number | Surface Numbers | | Power | f' | lpp | l'pp |
|---|---|---|---|---|---|---|
| 1 | 1 | 2 | −0.18768E−01 | −53.283 | 6.0396 | 0.13147E−01 |
| 2 | 3 | 4 | −0.18454E−01 | −54.190 | 1.6264 | −0.11814 |
| 3 | 4 | 5 | 0.19708E−01 | 50.741 | 0.96215 | −4.7351 |
| 4 | 7 | 8 | 0.15157E−01 | 65.977 | 4.4810 | −2.0369 |
| 5 | 8 | 9 | −0.11907E−01 | −83.981 | −0.82089 | −2.5895 |
| 6 | 10 | 11 | 0.10986E−02 | 910.28 | 37.054 | 34.273 |
| 7 | 12 | 13 | 0.10863E−01 | 92.055 | 7.4695 | 1.0539 |

First-Order Properties of Doublets

| Element Numbers | | Surface Numbers | | Power | f' | lpp | l'pp |
|---|---|---|---|---|---|---|---|
| 2 | 3 | 3 | 5 | 0.16469E−02 | 607.19 | 14.554 | 7.3696 |
| 4 | 5 | 7 | 9 | 0.34689E−02 | 288.28 | 0.30695 | −7.9026 |

TABLE 6

Lens Data

| Surf. No. | Type | Radius | Thickness | Glass | Clear Aperture Diameter |
|---|---|---|---|---|---|
| 1 | a | 292.8219 | 9.00000 | ACRYLIC | 96.26 |
| 2 | ac | 28.1642 | 120.24370 | | 66.85 |
| 3 | | −266.8324 | 3.00000 | LAC8 | 35.99 |
| 4 | | 33.2578 | 9.50000 | FD8 | 34.91 |
| 5 | | −259.6141 | 53.16168 | | 34.46 |
| 6 | | Aperture stop | 42.00000 | | 23.38 |
| 7 | | 519.0042 | 9.50000 | FCS | 34.73 |
| 8 | | −47.2408 | 3.16000 | SF6 | 36.16 |
| 9 | | −131.0132 | 5.87579 | | 38.06 |
| 10 | | 72.7138 | 10.13644 | FC5 | 42.51 |
| 11 | ac | −56.1142 | 10.00000 | | 42.74 |
| 12 | | ∞ | 102.50000 | BK7 | 39.77 |
| 13 | | ∞ | 3.00000 | ZK7 | 25.31 |
| 14 | | ∞ | 1.02121 | | 24.88 |

Symbol Description a - Polynomial asphere
c - Conic section

Focal Shift = −0.08000

Conics

| Surface Number | Constant |
|---|---|
| 2 | −9.0000E−01 |
| 11 | −1.4000E+00 |

Even Polynomial Aspheres

| Surf. No. | D | E | F | G | H | I |
|---|---|---|---|---|---|---|
| 1 | 1.4941E−07 | −1.6298E−10 | 9.7911E−14 | 4.6897E−18 | −1.2743E−20 | 2.1836E−24 |
| 2 | 9.2188E−07 | 3.5505E−10 | −3.3822E−13 | 5.5051E−16 | 3.0208E−19 | −1.9330E−22 |
| 11 | 1.5012E−06 | −4.0662E−09 | 1.4997E−11 | −7.7650E−15 | −5.8554E−17 | 8.2240E−20 |

SYSTEM FIRST ORDER PROPERTIES

OBJ. HT: −1220.0  f/ 3.00  MAG: −0.0100
STOP: 0.00 after surface 6. DIA: 22.169
EFL: 16.6986  FVD: 382.099  ENP: 53.5799

TABLE 6-continued

| | IMD: 1.02121 | | BRL: 381.078 | | EXP: −879.883 |
|---|---|---|---|---|---|
| | 0BD: −1616.60 | | OVL: 1998.70 | | |

First Order Properties of Elements

| Element Number | Surface Numbers | | Power | f' | lpp | l'pp |
|---|---|---|---|---|---|---|
| 1 | 1 | 2 | −0.15668E−01 | −63.826 | 6.7420 | 0.64846 |
| 2 | 3 | 4 | −0.24318E−01 | −41.121 | 1.5479 | −0.19293 |
| 3 | 4 | 5 | 0.23233E−01 | 43.042 | 0.64535 | −5.0377 |
| 4 | 7 | 8 | 0.11234E−01 | 89.012 | 5.8797 | −0.53518 |
| 5 | 8 | 9 | −0.10813E−01 | −92.478 | −0.99999 | −2.7733 |
| 6 | 10 | 11 | 0.15045E−01 | 66.469 | 3.9439 | −3.0436 |

First-Order Properties of Doublets

| Element Numbers | | Surface Numbers | | Power | f' | lpp | l'pp |
|---|---|---|---|---|---|---|---|
| 2 | 3 | 3 | 5 | −0.61182E−03 | −1634.5 | −30.284 | −38.357 |
| 4 | 5 | 7 | 9 | 0.36454E−03 | 2743.2 | 19.667 | 11.551 |

TABLE 7

| Lens | $f_0$ | $D_{12}$ | $D_{23}$ | BFL | $f_2$ | EPD |
|---|---|---|---|---|---|---|
| 1 | 77.03 | 113.79 | 54.70 | 265.98 | −418.41 | 355 |
| 2 | 61.86 | 122.40 | 72.27 | 271.94 | −213.40 | 355 |
| 3 | 11.50 | 78.22 | 50.40 | 60.08 | −114.84 | 2200 |
| 4 | 16.70 | 120.64 | 96.01 | 80.31 | −3342.6 | 2800 |
| 5 | 16.70 | 120.78 | 96.32 | 80.32 | 607.19 | −1214.3 |
| 6 | 16.70 | 120.24 | 95.16 | 80.33 | −1634.5 | −879.9 |

What is claimed is:

1. A projection lens for forming an image of an object, said lens comprising in order from its image end to its object end:

(A) a first lens unit having a negative power and comprising a plastic lens element having at least one aspheric surface;

(B) a second lens unit having a negative power or a weak positive power and comprising a color correcting doublet;

(C) a third lens unit having a positive power and comprising an aspheric surface either on a glass element or on a weak plastic element;

wherein:

$D_{12}/f_0 > 1.0$, $D_{23}/f_0 > 0.7$, $1.5 < (D_{12} + D_{23} + BFL)/BFL < 4.0$, and $BFL/f_0 > 3$.

where:

(i) $f_0$ is the effective focal length of the combination of the first, second, and third lens units;

(ii) BFL is the back focal length of the combination of the first, second, and third lens units for an object located at infinity along the long conjugate side of the projection lens;

(iii) $D_{12}$ is the distance between the first and second lens units; and (iv) $D_{23}$ is the distance between the second and third lens units.

2. The projection lens of claim 1 wherein:

$BFL/f_0 > 4.0$.

3. The projection lens of claim 1 wherein:

$BFL/f_0 > 5.0$.

4. The projection lens of claim 1 wherein:

$|EPD|/f_0 > 4.0$, where EPD is the distance from the object to the projection lens' entrance pupil for light traveling from the object to the image.

5. The projection lens of claim 4 wherein:

$|EPD|/f_0 > 100$.

6. The projection lens of claim 1 wherein the first lens unit comprises at least two aspheric surfaces.

7. The projection lens of claim 1 wherein the first lens unit consists of a single lens element.

8. The projection lens of claim 7 wherein the single lens element has two aspheric surfaces.

9. The projection lens of claim 1 wherein the first lens unit comprises two lens elements.

10. The projection lens of claim 9 wherein each of the two lens elements has two aspheric surfaces.

11. The projection lens of claim 1 wherein the second lens unit comprises two color correcting doublets.

12. The projection lens of claim 1 wherein the second lens unit comprises only glass lens elements.

13. The projection lens of claim 1 wherein the third lens unit comprises a color correcting doublet.

14. The projection lens of claim 1 wherein the BFL does not change substantially as the lens is heated from room temperature to its operating temperature.

15. The projection lens of claim 1 wherein $f_0$ is less than 20 millimeters.

16. The projection lens of claim 1 wherein:

$1.0 < D_{12}/D_{23} < 2.5$.

17. The projection lens of claim 1 wherein the lens has a distortion which is less than about one percent at the image.

18. The projection lens of claim 1 wherein the lens has a half field of view in the direction of the image greater than about 35°.

19. The projection lens of claim 1 wherein the object is a pixelized panel.

20. The projection lens of claim 19 wherein the lens has a lateral color aberration which is less than about a pixel at the object.

21. A projection lens system for forming an image of an object, said system comprising:
(a) an illumination system comprising a light source and illumination optics which forms an image of the light source, said image of the light source being the output of the illumination system;
(b) a pixelized panel which comprises the object; and
(c) the projection lens of claim 1;
wherein said projection lens has an entrance pupil whose location substantially corresponds to the location of the output of the illumination system.

22. A variable magnification projection lens system which forms an image of an object and comprises:
(A) an illumination system comprising a light source and illumination optics which forms an image of the light source, said image of the light source being the output of the illumination system;
(B) a pixelized panel, which comprises the object; and
(C) a projection lens which comprises:
  (i) a first lens unit having a negative power and comprising a plastic lens element having at least one aspheric surface;
  (ii) a second lens unit having a negative power or a weak positive power and comprising a color correcting doublet;
  (iii) a third lens unit having a positive power and comprising an aspheric surface either on a glass element or on a weak plastic element;
wherein the magnification of the projection lens system is varied by changing the distance between the pixelized panel and the second and third lens units while holding constant (a) the distance between the second and third lens units and (b) the distance between the first lens unit and the pixelized panel.

* * * * *